Figure 1:
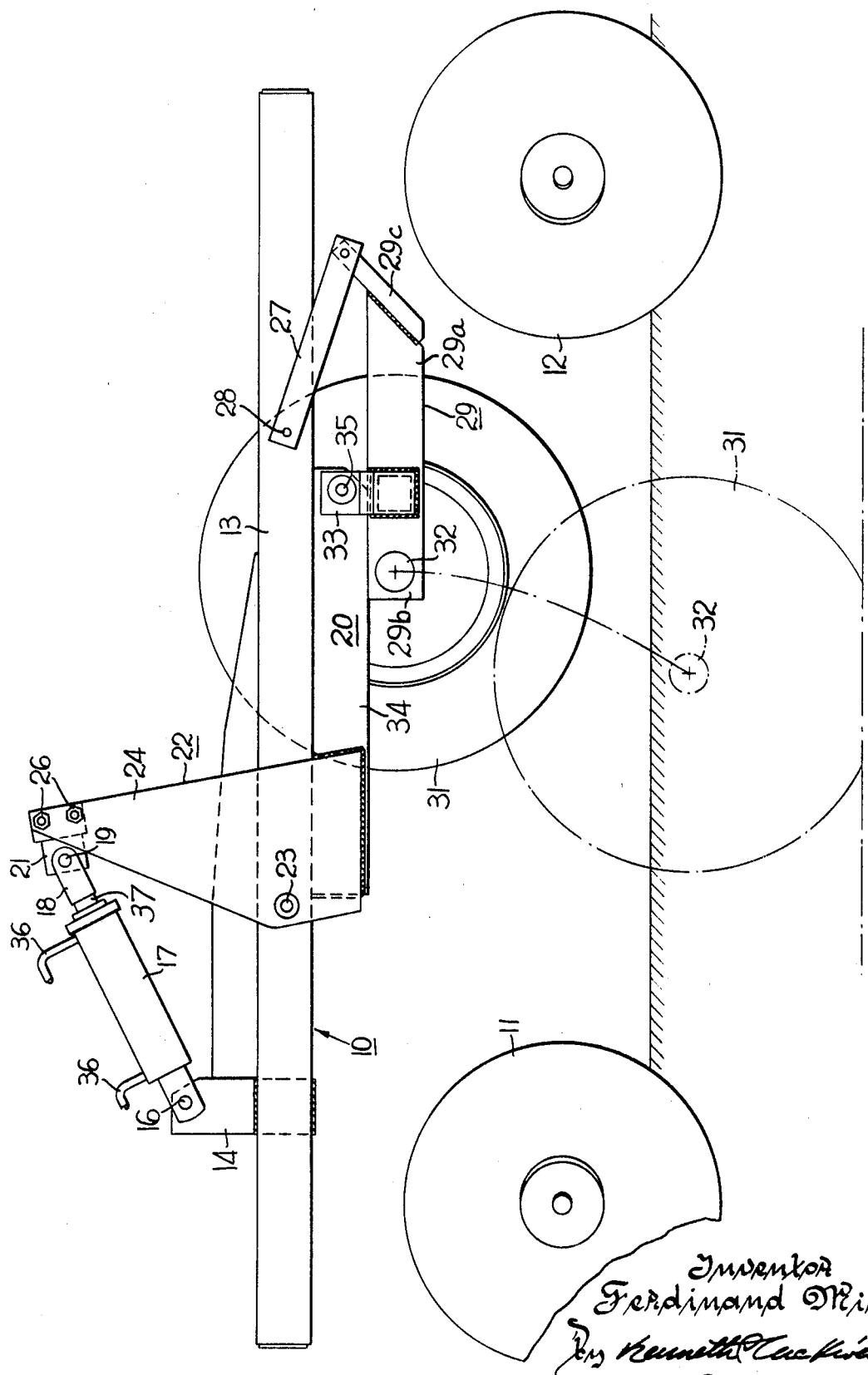

United States Patent

[11] 3,590,928

| [72] | Inventor | Ferndinand Mirus<br>Ojai, Calif. |
|---|---|---|
| [21] | Appl. No. | 819,553 |
| [22] | Filed | Apr. 28, 1969 |
| [45] | Patented | July 6, 1971 |
| [73] | Assignee | Allis-Chalmers Manufacturing Company<br>Milwaukee, Wis. |

[54] TRANSPORT WHEEL LINKAGE MECHANISM
5 Claims, 2 Drawing Figs.
[52] U.S. Cl.................................................. 172/240,
172/413, 172/580
[51] Int. Cl....................................................A01b 63/22,
A01b 73/00
[50] Field of Search........................................... 172/240,
415, 244, 413, 395, 411, 423, 579, 580, 583;
280/43, 47.13

[56] References Cited
UNITED STATES PATENTS

| 2,623,341 | 12/1952 | Evans et al................... | 172/579 X |
| 2,939,539 | 6/1960 | Kramer........................ | 172/413 X |
| 3,091,476 | 5/1963 | Blake........................... | 172/413 |
| 3,292,714 | 12/1966 | Tsuchiya et al.............. | 172/583 |

Primary Examiner—Stephen C. Pellegrino
Attorneys—Kenneth C. McKivett, Robert B. Benson and Charles L. Schwab ABSTRACT: A semimounted or pulled type agricultural implement having wheels used for transport and depth control and wherein such wheels are positioned between a front and a rear ground working tool. Linkage for supporting such wheels adjacent the center of gravity for transport purposes and for positioning such wheels sufficiently spaced from the discharge portion of the front ground working tool as to avoid plugging of material between such tool and such wheel.

TRANSPORT WHEEL LINKAGE MECHANISM

This invention relates to a semimounted or to a pulled type agricultural implement transport and depth control.

Some of the problems involved in the design of an implement having a forward and a rear set of ground working members with combination transport and depth control wheels positioned between such members is to obtain a travel of the transport wheel from working position to transport position such that:

1. In working position the wheels and tires are far enough to the rear of the front gang so as not to obstruct the normal flow of dirt and trash as it is discharged from the front gangs.
2. The normal movement of the wheel axis from working position to transport position can be set to obtain proper balance of the implement for towing. This is to be done with the minimum gang spread as dictated by (1) and with the transport wheels as near the front side of the rear gang as practical when in working position.

If the foregoing two requirements are achieved, the resultant implement has the front and rear gangs as close together as possible for good working and towing characteristics resulting in minimum lengths of frame members and the most compact implement possible.

Accordingly, it is an object of this invention to provide an implement having front and rear mounted ground working members spaced apart by combination transport and depth control wheels wherein the linkage supporting said wheels is such that the front and rear members can be mounted close together without sacrificing efficiency of operation or transport.

Figure 2:
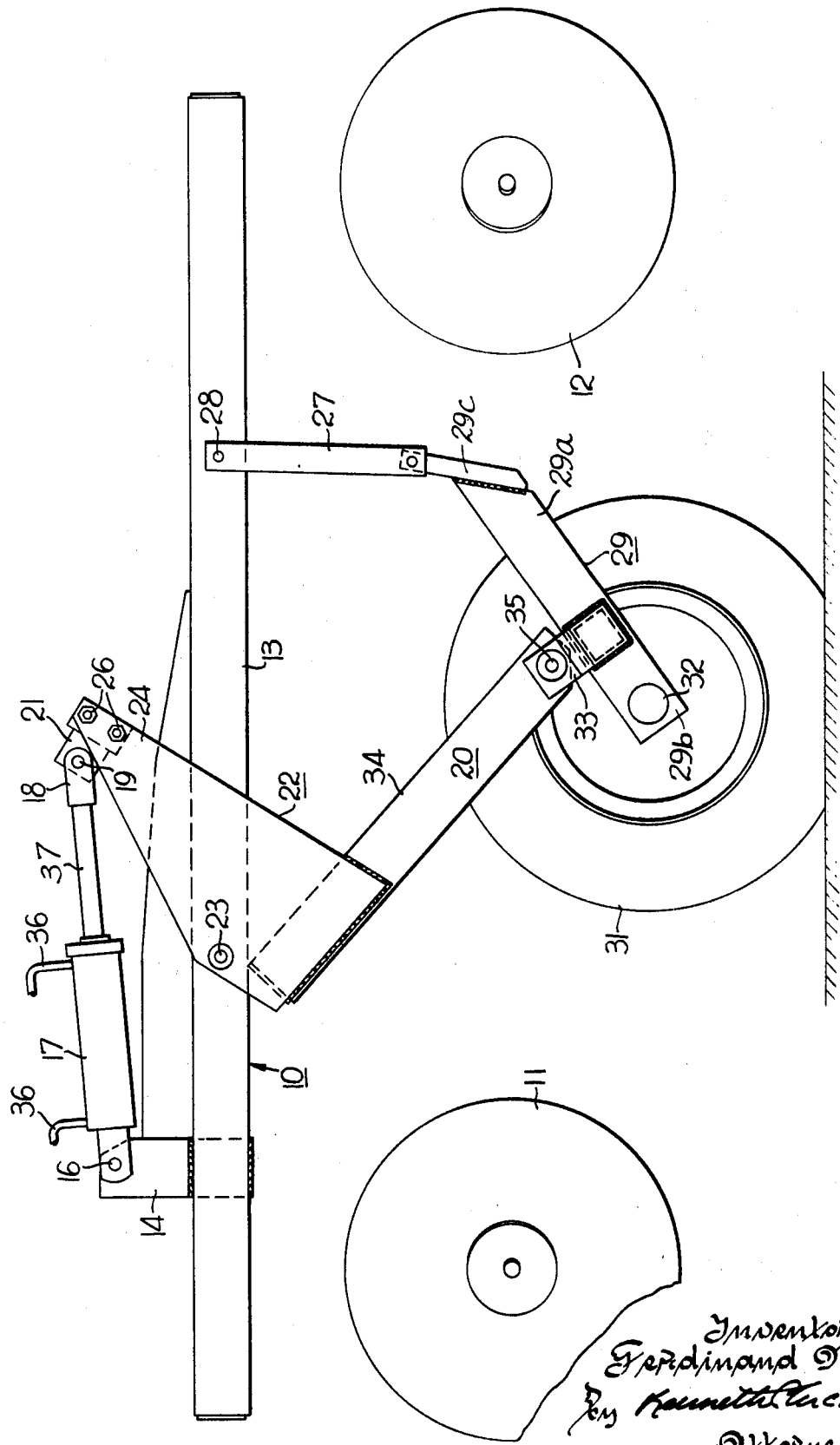

Referring to the drawings:

FIG. 1 is a side elevation of a portion of a disc harrow embodying the invention with the parts shown in working position; and FIG. 2 is a side elevation similar to FIG. 1 showing the disc harrow in transport position.

Referring to the drawings, the reference numeral 10 has been used to designate a farm implement such as a disc harrow for the purpose of illustrating the invention. This disc harrow has a forward gang of disc blades 11 and a rear gang 12. The means for supporting these gangs from the main frame 13 of the disc harrow 10 are not shown, as conventional means of support well known in the prior art may be used and form no part of this invention except to say that gangs 11 and 12 are carried by frame 13 and move therewith.

A vertically extending bracket 14 is attached to frame 13 as by welding and at its upper end bracket 14 pivotally supports a pivot pin 16 which is pivotally connected to one end of a hydraulic cylinder 17. The rod end 18 of cylinder 17 is pivotally connected to a pin 19 carried by a bracket 21. Double crank mechanism 20 including a first crank 22 is pivotally connected to main frame 13 for movement about pivot pin 23 carried by frame 13. Bracket 21 is attached between the two arms 24 (only one of which is shown) of crank 22 by conventional means such as nuts and bolts 26.

A pair of links 27 (only one of which is shown) are pivotally connected to frame 13 by means of pivot pins 28. Each link 27 is pivotally connected at the other end thereof to one end of a fabricated crank 29 made up of a pair of arms 29a and 29b and wherein an extension number 29c is attached to the distal end of arm 29a as by welding. Link 27 is pivotally connected to the free end of member 29c. The outer end of arm 29b of crank 29 rotatably supports a transport and gauging wheel 31 by conventional means including a wheel spindle 32 attached to crank arm 29b. Adjacent spindle 32, a bracket 33 is attached to second crank 29 as by welding and bracket 33 is pivotally attached at its upper end to arm 34 of first crank 22 by means of pivot pin 35.

It is to be understood that while only one wheel 31 and its supporting mechanism has been shown that duplicates of this structure would be utilized on the opposite side of the machine but a showing thereof is not necessary to be repeated to understand this invention.

Hydraulic cylinder 17 is provided with hydraulic connections 36 adapted to be connected to a tractor (not shown) and with it hydraulic controls (not shown). When hydraulic cylinder 17 is actuated to extend ram 37, crank 22 is pivoted clockwise about pin 23 until wheel 31 has raised frame 13 and thereby gangs 11 and 12 a desired amount such as is shown in FIG. 2.

A study of FIG. 2 indicated that wheel 31 in the transport position is substantially equidistant relative to gangs 11 and 12 and as these gangs represent most of the weight of the implement it appears that wheel 31 is well positioned to support the implement in transport as wheels are positioned on transverse alignment substantially at the center of gravity of the implement.

Now referring to FIG. 1 which shows wheel 31 raised to its maximum height with gangs 11 and 12 in working position, it is readily seen that if wheel 31 has been merely mounted for pivotal movement about pivot pin 23, then there definitely would have been an interference problem with gang 12 when wheel 31 was raised. However, with the linkage utilized in this invention, wheel 31 can be positioned for most efficient transportation of the implement as shown in FIG. 2 and can also be positioned for most efficient operation of the gangs with a maximum amount of clearance being provided between the rear side of gang 11 and wheel 31, thus making it possible to locate gang 11 very close to gang 12 resulting in shorter more economical frame structure, yet with efficiency of operation as shown in FIG. 1 (discing or working position). It should also be noted arm 34 has been moved to a position parallel to frame 13 and crank 29 is parallel to arm 34 to provide maximum ground clearance.

The embodiments of the invention in which I claim an exclusive property or privilege are defined as follows:

1. In a farm implement including a main frame, front and rear gangs carried by said main frame, transport wheels pivotally mounted from said frame between said gangs, a double crank mechanism supporting each wheel from said main frame and being so constructed and arranged that when said implement are in transport position said wheels is positioned midway between said gangs and when said implement is in working position said wheels are positioned between said gangs but adjacent the forward portion of said rear gang to provide clearance for material acted upon by said front gang, said double crank mechanism comprising a first crank pivotally mounted on said frame and having one arm thereof pivotally mounting a second crank, one arm of said second crank rotatably supporting each wheel and the other arm of said second crank being pivotally connected to a link which is pivotally carried by said frame, and means connected to the other arm of said first crank for raising and lowering said wheel.

2. The combination recited in claim 1 and wherein said double crank mechanism is positioned between the axes of said front and rear gangs.

3. The combination recited in claim 1 and wherein said means comprises a hydraulic ram carried by said frame.

4. The combination recited in claim 3 and wherein said double crank means is so positioned when said wheels are in working position to present the lower portion of said crank means extending parallel to the ground and adjacent to said main frame.

5. The combination recited in claim 4 and wherein said double crank means is positioned below said main frame when said wheels are in working position.